July 10, 1956  J. A. ANDERSON, JR., ET AL  2,754,340
AROMATICS AND RESINS PRODUCTION
Filed Dec. 11, 1953
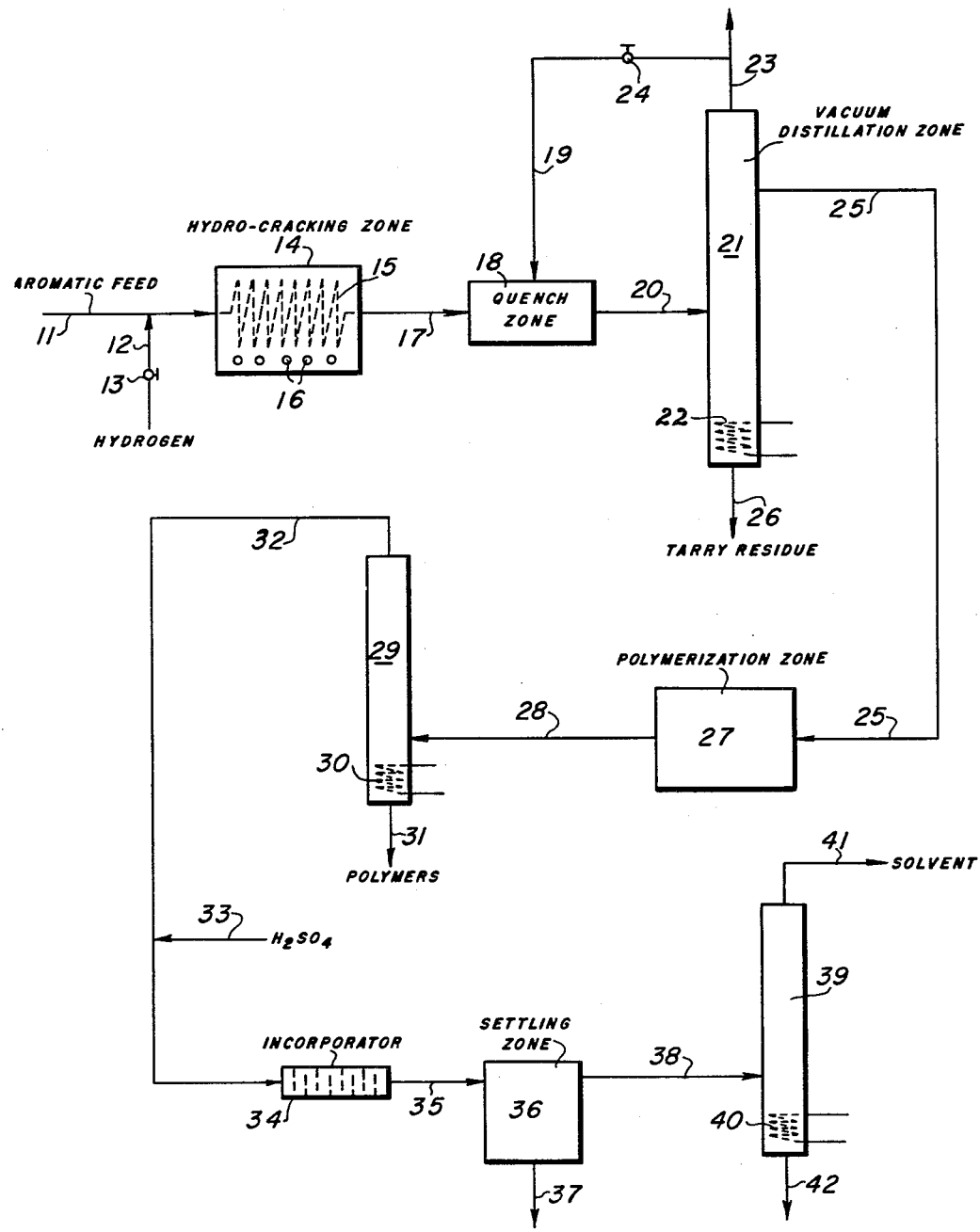
INVENTORS.
James A. Anderson, Jr.,
Edward J. Hoffmann,
BY
ATTORNEY.

United States Patent Office 2,754,340
Patented July 10, 1956

2,754,340

AROMATICS AND RESINS PRODUCTION

James A. Anderson, Jr., and Edward J. Hoffmann, Baytown, Tex., assignors, by mesne assignments, to Esso Research and Engineering Company, Elizabeth, N. J., a corporation of Delaware Application December 11, 1953, Serial No. 397,642

6 Claims. (Cl. 260—669)

The present invention is directed to a method for obtaining aromatic hydrocarbons. More particularly, the invention is directed to a method for purifying aromatic hydrocarbon fractions. In its more specific aspects, the invention is directed to a method for purifying aromatic hydrocarbons and forming valuable hydrocarbons, such as styrenes and indenes.

The present invention may be briefly described as a method for obtaining aromatic hydrocarbons in which a feed aromatic hydrocarbon fraction containing saturated hydrocarbons and alkylated aromatic hydrocarbons and indanes and boiling in the range between 100° and 550° F. is subjected to a temperature between 1100° and 1200° F. in the presence of hydrogen to form a product containing an appreciated amount of aromatic hydrocarbons and dehydrogenated hydrocarbons, such as styrenes and indenes. The product is rapidly cooled or quenched to a temperature not in excess of 200° F. and the quenched product is then distilled under a reduced pressure at a temperature not in excess of 200° F. to remove hydrocarbons boiling above and below the boiling range of the feed. The distilled product containing the appreciated amount of aromatic hydrocarbons and dehydrogenated hydrocarbons is then subjected to polymerization to form polymers of the styrenes and/or indenes. The polymerization operation serves to form a product of higher boiling point than the aromatic hydrocarbons and the polymer product may then be removed by distillation to recover a polymerized fraction and the aromatic hydrocarbons in substantial purity. The aromatic hydrocarbons may suitably be used either with or without further purification as aromatic hydrocarbon solvents. The reacting surface in the reaction zone may be either a ceramic surface or it may be an alloy of steel such as one of the chrome-nickel types of the 18–8 or 25–20 type. For the lower alloys, such as 18–8 stainless steel, a word of caution is necessary. Such chrome-nickel steels are subject to attack by the high temperature reaction and it may be desirable to so treat the metallic surface to inhibit the attack of the metallic surface by the reducing atmosphere of hydrocarbons and hydrogen in contact therewith. For example, it may be desirable to include as a component of the feed stock a suitable poison for the metallic surface to prevent the catalyzing and forming of cokey bodies, which, in turn, favors the destruction of the alloy by carburization including the formation of metallic carbide. Sulfur compounds are suitable for producing this effect.

The styrenes and indenes produced in the thermal reaction may be readily polymerized to resinous materials finding great use in the chemical trade. These polymerization procedures may include many of the polymerization processes known to the arts. Such polymerization processes include the peroxide catalyzed free radical polymerization using such initiators as benzoyl peroxide or catalyzed polymerization by use of a mixture of an oxidizing agent and a reduction activating agent capable of reacting with the oxidizing agent (this method of catalysis is also known as the redox system). Such ionic catalysts as $BF_3$, $SnCl_4$, $AlCl_3$, also represent a class of polymerization processes which could be used in the production of high grade resins from the styrenes and indenes previously produced. Solid catalysts such as activated clay, also find use in polymerization of aromatic olefins; Attapulgus clay may suitably be used as a polymerization catalyst for the products previously described.

Immediately prior to the polymerization step, the effluent product from the thermal reaction zone must be handled in the following manner to render it suitable for subsequent polymerization. The hot products leaving the reaction zone are quenched as rapidly as possible to a temperature not exceeding 200° F.; the quench material may be either recycled product or steam. The quenched product may then be sent through a separating drum to separate the gaseous product from the liquid material. The liquid recovered in this separation step is then subjected to vacuum distillation to remove the trace amounts of tarry materials formed during the reaction. Because of the danger of thermal polymerization and its resultant effect on decreasing the quality of the polymerized product, it is necessary that this distillation be operated so as to not exceed at any point a temperature of 200° F. Suitable inhibitor injection may be used to cut down on peroxide catalyzed free radical polymerization. These inhibitors are well known to the art and may include elemental sulfur, tertiary butyl catechol, and the like.

The temperatures to be employed in the practice of the present invention suitably are in the range between 1000° and 1200° F. At a temperature below 1000° F. the aromatic hydrocarbons are not purified and at temperatures above 1200° F. dealkylation reactions predominate. A preferred temperature is about 1150° F.

Pressures may suitably range from 0 to 300 pounds per square inch gauge with desirable results at about 150 pounds per square inch gauge.

The heating operation may be conducted for a time in the range from about 1 to 50 seconds with quite desirable results being obtained when a temperature of about 1150° F. is used at about 7 seconds.

The feed stock may suitably comprise aromatic fractions containing an excess of about 40% by volume of aromatic hydrocarbons. This stock may contain alkylated aromatic hydrocarbons, such as toluene, xylenes, ethyl benzene, propyl benzene, methylethyl benzene, diethyl benzene and the like. It is necessary for the formation of styrenes that the aromatic hydrocarbons in the feed stock have alkyl side chains with at least 2 carbon atoms in the chain. The feed stock may also contain the indanes, such as 1-methylindane; 2-methylindane; 4-methylindane; 5-methylindane; 4,5,6-trimethylindane; 1,1-dimethylindane; 1,2-dimethylindane; 1,2,3-trimethylindane and 1,2,3,4,5,6,7-heptamethylindane. The aromatic hydrocarbon fraction may also contain olefins and saturated hydrocarbons, such as paraffins and naphthenes and compounds such as tetralin and its homologues.

The aromatic hydrocarbon feed may suitably boil in the range between about 100° and about 900° F. but preferably may boil in the range between about 100° and 550° F. While any aromatic hydrocarbon feed may be employed, the feed may suitably be a solvent extract of a kerosene fraction, such as a sulfur dioxide extract. The feed stock may suitably contain from about 40% to about 80% aromatics and may be obtained from aromatic rich streams derived by solvent extraction of petroleum distillates or from fractions produced in catalytic conversion operations such as catalytic cracking. In some instances it may be desirable to employ as feed stock, fractions containing in excess of 80% aromatics, for example fractions containing 90% or 95% or more aromatics. The aromatic feed may contain appreciable quantities of sulfur particularly when the aromatic fraction is a solvent extract of petroleum fractions such as sulfur dioxide extracts. The feed stock may also suitably be a gas oil, fractions thereof, or solvent extract of such fractions.

The quenching operation to reduce the temperature to a temperature not in excess of 200° F. may be conducted by contacting the product immediately after it leaves the heating zone with a hydrocarbon quenching liquid at a much lower temperature than the product. For example, a light fraction obtained by distilling the heated product may suitably be used as the quenching liquid. It is desirable that the product be quenched to a temperature not in excess of 200° F. within about 30 seconds after the heating operation has been concluded.

After the quenching operation the product is distilled at a reduced pressure at a temperature not in excess of 200° F. to remove hydrocarbons boiling above and below the boiling range of the feed and to recover a product containing appreciated quantities of aromatic hydrocarbons and dehydrogenated hydrocarbons. This latter product is then polymerized by contacting same with a polymerization catalyst, such as clay, a Friedel-Crafts catalyst, such as aluminum chloride and the like. Under some conditions it may be desirable to conduct the polymerization operation by heating the recovered product in the liquid phase to a temperature in the range between about 300° and 500° F. When clay is the polymerization catalyst, a temperature in the range between 300° and 400° F. gives satisfactory results.

The polymerized product may suitably be distilled to separate the higher boiling polymers from the purified aromatics. The purified aromatics may be subjected to further treatment, such as contact with sulfuric acid, to remove any residual olefins and other undesirable materials.

The present invention will be further illustrated by reference to the drawing in which the single figure represents a flow diagram of a preferred mode.

Referring now to the drawing, numeral 11 designates a charge line through which a feed stock of the type described is introduced into the system from a source not shown. This feed stock may contain single ring naphthenes or tetralins naturally occurring in the feed stock or naphthenes which may be added to the feed stock. The naphthenes may serve as a source of hydrogen and may replace part of the hydrogen in the operation. In any event, the feed stock as described is introduced by line 11 and has admixed with it hydrogen introduced from a source not shown by line 12 controlled by valve 13. The mixture of aromatic feed and hydrogen is then introduced by line 11 into a hydrocracking zone 14 containing a coil 15 and which is supplied with heat by burners 16. The temperature of the mixture in coil 15 is raised to a temperature within the range between 1100° and 1200° F. and the mixture passed through the zone under the contact conditions mentioned hereinbefore. A product is obtained which discharges from zone 14 by line 17 into a quenching zone 18 where the hydrocarbon product is rapidly cooled to a temperature not in excess of 200° F. by means of a hydrocarbon fraction introduced into zone 18 by line 19 from a source which will be described further.

The quenched product from zone 18 is then discharged by line 20 into a distillation zone 21 which is provided with a heating means illustrated by a steam coil 22 and which is provided with suitable vapor-liquid internal contacting means, such as bell cap trays, packing equipment and the like which are conventional to the art. Distillation zone 21 includes all auxiliary equipment normally associated with vacuum distillation operations and which will include means for inducing reflux, condensing and cooling means, vacuum pumps, and the like.

From distillation zone 21 there is recovered as overhead by line 23 gases and light fractions which are the products of cracking the paraffins and/or naphthenes included with the feed introduced by line 11. These products may be discharged from the system by line 23 for use as may be desired after removal of non-condensibles. A portion of these products is desirably employed as quench by introducing a portion of same by line 19 into quenching zone 18. To this end, line 19 is provided with a valve 24 to control the amount of quench introduced into zone 18.

An aromatic fraction of appreciated aromatic content and containing dehydrogenated products, such as styrenes and indenes, and having substantially the same boiling point range as the aromatic feed is recovered by line 25. Heavier ends are discharged from zone 21 by line 26 and these heavier ends may contain tarry residue which may result from polymerization of some of the product. The tarry residue and any heavy carbonaceous fractions produced in zone 14 and in zone 21 will be of a minor nature.

The aromatic fraction in line 25 is routed thereby into a polymerization zone 27 which may contain a polymerization catalyst, such as one of the type prescribed. Conditions are adjusted in zone 27 to polymerize the styrenes and/or indenes to form a polymer which is suitable for use in resin manufacture and the like. The polymerized product is withdrawn from zone 27 by line 28 and subjected to distillation under reduced pressure to prevent degradation of polymer in a distillation zone 29 which is provided with a heating means illustrated by a steam coil 30. Zone 29 is also provided with auxiliary equipment necessary for distillation operations such as vapor-liquid contacting means, reflux inducing means, means such as vacuum pumps and the like for reducing pressure, condensing and cooling means normal to such fractional distillation operations.

The polymer is withdrawn from zone 29 by line 31 for further use in resin manufacture and the like, while the purified aromatic fraction is recovered by line 32 and may be admixed with sulfuric acid introduced into line 32 by line 33 from a source not shown. This acid may be of sufficient strength to remove any residual olefins and other undesirable materials from the purified aromatic fraction. The mixture of sulfuric acid and aromatic fraction is intimately contacted in an incorporator or mixing zone 34 and then discharged by line 35 into a settling zone 36 which is of sufficient capacity to allow a residence time for gravity separation of any sludge which may be formed from the sulfuric acid treatment. This sludge may be discharged from zone 36 by line 37 for use in treating additional quantities of the material in line 32 or for further use as may be desired.

The sulfuric acid treated product then issues from zone 36 by line 38 and may be subjected to further treatment, such as water washing, not shown, and the treated product then distilled in a distillation zone 39 which is similar in all respects to distillation zone 29 and is provided with a heating means illustrated by steam coil 40. By adjustments of temperature and pressure, the purified aromatic hydrocarbon solvent is withdrawn by line 41 while any heavier fractions may be discharged by line 42 for use as desired.

It may be seen from the foregoing description taken with the drawing that a number of features are associated with our invention. The reaction taking place in coil 15 is a hydrocracking operation in which substantially little, if any, coke is formed. In short, heavier products are not formed in the hydrocracking operation. The paraffins and naphthenes are removed from the aromatic hydrocarbons by conversion into lighter fractions, such as olefins. The alkylated aromatics and the indanes are not dealkylated but are dehydrogenated to form desirable styrenes and indenes. The tetralins are dehydrogenated to naphthalenes and serve as hydrogen donors. Another desirable feature of the present invention is that hydrogen is not consumed or made in the operation to any appreciable extent. Thus the hydrogen may be recycled to the operation, such as from line 23, if desired, after separation of the liquid hydrocarbons therefrom. Still another desirable result obtained in the practice of the present invention is the desulfurization of the aromatic rich feed stock by the reaction taking place in the reaction zone 14.

The present invention is particularly advantageous in producing from aromatic fractions of low aromatic content purified aromatic hydrocarbons having a purity in excess of 90%.

In order to illustrate the invention further, a fraction boiling up to 445° F. obtained from a sulfur dioxide extract of kerosene was subjected to a temperature in the range from 1100° to 1200° F. in the presence of 1155 standard cubic feet of hydrogen per barrel of feed. This fraction contains aromatics, alkylated aromatics, indanes, paraffins and naphthenes. The feed was charged to a coil at a vapor velocity of about 21 feet per second and for a contact time of 6.73 seconds. The product obtained had a bromine number of 28.5 and contained 95.7% by volume of aromatics, 1% by volume of olefins and 3.3% per volume of saturates. The initial feed contained 74.4% of aromatics.

In another operation a fraction boiling between about 445° F. and 550° F. obtained from the same sulfur dioxide extract of kerosene was passed through a heating coil at a temperature in the range between 1100° and 1150° F. at a hydrogen rate of 1147 standard cubic feet per barrel. The vapor velocity in this instance was 19.6 feet per second and the contact time was 7.12 seconds. The product had a bromine number of 29 and contained 99.6% by volume of aromatics, 0.2% by volume of olefins and 0.2% by volume of saturates. In this instance, the feed stock had an aromatic content of 90.7% by volume.

In still another run the total liquid sulfur dioxide extract of kerosene boiling in the range from 300° to 550° F. and containing 82.2% by volume of aromatics was heated to a temperature in the range from 1100° to 1150° F. in a coil in the presence of 1116 standard cubic feet of hydrogen per barrel. The vapor velocity per second was 20 feet and the contact time was about 7 seconds. Under these conditions the product was obtained which had a bromine number of 27 and an aromatics content of 97.1% by volume, olefins 0.6% by volume and saturates 0.3%. In these several operations the bromine number is an indication of the presence of the dehydrogenated hydrocarbons, particularly the styrenes and indenes. It is to be noted that the product has a low content of olefins.

In other operations, similar fractions were treated at different temperatures. For example, at 1080° F. a fraction having an initial aromatic content of 74.4% was heated under similar conditions and the aromatic content was raised to 78.5% by volume indicating that a temperature below 1100° F. does not give satisfactory results.

A product produced in accordance with the mode described above was treated at temperatures in the range from 300° to 350° F. by contacting same with unburned Attapulgus clay at pressures of 150 and 175 pounds per square inch gauge, respectively, sufficient to maintain a liquid phase, at a space velocity of 1 v./v./hour. By treatment of the product with the clay to polymerize same a polymer was formed in both instances.

A gasoline fraction from a sulfur dioxide extract of a kerosene fraction was subjected to a temperature of 1150° F., a pressure of 150 p. s. i. g. in the presence of 1000 cubic feet of hydrogen at contact times of 3, 6, and 12 seconds to produce products having aromatic contents of 92%, 96%, and 100% aromatics. The feed stock had an aromatic content of 80% to 85% per volume of aromatics. In these runs the sulfur was reduced from 0.95 weight per cent in the feed to levels of 0.3, 0.2, and 0.2 weight per cent, respectively, for the three products.

It is to be understood that a feature of our invention is the purification of aromatic hydrocarbons in the presence of hydrogen such that the saturated hydrocarbons which are contained in the feed hydrocarbons are largely converted to products of different boiling points such that they may be removed by distillation. A feature of the invention is that this reaction in the presence of hydrogen does not form coke and tarry bodies. In other words, the reaction coil 15 is not plugged after long operating times. To illustrate this feature, the coil, like coil 15, was open after running at least 42 hours and it was found that the coil was free of clogging deposits. Numerous runs of like duration were made and coking was not observed.

The nature and objects of the present invention having been completely described and illustrated, what we desire to claim as new and useful and to secure by Letters Patent is:

1. A method for obtaining aromatic hydrocarbons from a feed aromatic hydrocarbon fraction containing aromatic and saturated hydrocarbons boiling in the range between about 100° F. and 900° F. which comprises heating said feed aromatic hydrocarbon fraction to a temperature in the range between 1100° and 1200° F., at a pressure in the range from 0 to 300 pounds per square inch gauge for a time in the range from about 1 to 50 seconds in the presence of hydrogen in a thermal reaction zone in the absence of active metallic surface to form a product containing an appreciated amount of aromatic hydrocarbons, rapidly quenching said product to a temperature not in excess of 200° F. within about 30 seconds after said heating, distilling said quenched product under a reduced pressure at a temperature not in excess of 200° F. to remove hydrocarbons boiling above and below the boiling range of the feed, recovering a distilled product containing said appreciated amount of aromatic hydrocarbons, and polymerizing said recovered product in the liquid phase at a temperature in the range between about 300° and 500° F. to form a polymer having a boiling point higher than the aromatic hydrocarbons and a purified aromatic hydrocarbon product.

2. A method for obtaining aromatic hydrocarbons from a feed aromatic hydrocarbon fraction containing aromatic and saturated hydrocarbons boiling in the range between 100° and 550° F. which comprises heating said feed aromatic hydrocarbon fraction to a temperature in the range between 1100° and 1200° F., at a pressure in the range from 0 to 300 pounds per square inch gauge for a time in the range from about 1 to 50 seconds in the presence of hydrogen in an amount in the range between 500 and 2000 cubic feet per barrel of feed in a thermal reaction zone in the absence of active metallic surface to form a product containing an appreciated amount of aromatic hydrocarbons, rapidly quenching said product to a temperature not in excess of 200° F. within about 30 seconds after said heating, distilling said quenched product under a reduced pressure at a temperature not in excess of 200° F. to remove hydrocarbons boiling above and below the boiling range of the feed, recovering a distilled product containing said appreciated amount of aromatic hydrocarbons and polymerizing said recovered product in the liquid phase at a temperature in the range between about 300° and 500° F. to form a polymer having a boiling point higher than the aromatic hydrocarbons and a purified aromatic hydrocarbon product.

3. A method in accordance with claim 2 in which the recovered product is polymerized by contact with clay.

4. A method for obtaining aromatic hydrocarbons from a feed aromatic hydrocarbon fraction containing aromatic and saturated hydrocarbons boiling in the range between 100° and 550° F. which comprises heating said feed aromatic hydrocarbon fraction to a temperature in the range between 1100° and 1200° F., at a pressure in the range from 0 to 300 pounds per square inch gauge for a time in the range from about 1 to 50 seconds in the presence of hydrogen in an amount in the range between 500 and 2000 cubic feet per barrel of feed in a thermal reaction zone in the absence of active metal surface to form a product containing an appreciated amount of aromatic hydrocarbons, rapidly quenching said product to a temperature in the range between 150° and 200° F. within about 30 seconds after said heating, distilling said quenched product under a reduced pressure at a temperature not in excess of 200° F. to remove hydrocarbons boiling above and below the boiling range of the feed, recovering a distilled product containing said appreciated amount of aromatic hydrocarbons and polymerizing said recovered product at a temperature in the range between 300° and 400° F. in the liquid phase by contacting said recovered product with clay to form a polymer having a boiling point higher than the aromatic hydrocarbons and a purified aromatic hydrocarbon product.

5. A method for obtaining aromatic hydrocarbons from a feed aromatic hydrocarbon fraction containing aromatic and saturated hydrocarbons boiling in the range between 100° and 550° F. which comprises heating said feed aromatic hydrocarbon fraction to a temperature in the range between 1100° and 1200° F., at a pressure in the range from 0 to 300 pounds per square inch gauge for a time in the range from about 1 to 50 seconds in the presence of hydrogen in an amount in the range between 500 and 2000 cubic feet per barrel of feed in a thermal reaction zone in the absence of active metallic surface to form a product containing an appreciated amount of aromatic hydrocarbons, rapidly quenching said product to a temperature in the range between 150° and 200° F. within about 30 seconds after said heating, distilling said quenched product under a reduced pressure at a temperature not in excess of 200° F. to remove hydrocarbons boiling above and below the boiling range of the feed, recovering a distilled product containing said appreciated amount of aromatic hydrocarbons, and polymerizing said recovered product in the presence of clay at a temperature in the range between 300° and 400° F., at a pressure sufficient to maintain a liquid phase, and at a space velocity in the range between 0.5 to 2.0 v./v./hour to form a polymer having a boiling point higher than the aromatic hydrocarbons and a purified aromatic hydrocarbon product.

6. A method for obtaining aromatic hydrocarbons from a feed aromatic hydrocarbon fraction containing aromatic and saturated hydrocarbons which comprises heating said feed aromatic hydrocarbon fraction to a temperature in the range between 1100° and 1200° F., at a pressure in the range from 0 to 300 pounds per square inch gauge for a time in the range from about 1 to 50 seconds in the presence of hydrogen in a thermal reaction zone in the absence of active metallic surface to form a product containing an appreciated amount of aromatic hydrocarbons, rapidly quenching said product to a temperature not in excess of 200° F. within about 30 seconds after said heating, distilling said quenched product under a reduced pressure at a temperature not in excess of 200° F. to remove hydrocarbons boiling above and below the boiling range of the feed and recovering a distilled product containing said appreciated amount of aromatic hydrocarbons, polymerizing said recovered product in the liquid phase at a temperature in the range between about 300° and 500° F. to form a polymer having a boiling point higher than the aromatic hydrocarbons and a purified aromatic hydrocarbon product, and distilling the polymerized product to recover said polymer and the purified aromatic product.

References Cited in the file of this patent

UNITED STATES PATENTS

| | | |
|---|---|---|
| 2,228,788 | Soday | Jan. 14, 1941 |
| 2,410,042 | Bond | Oct. 29, 1946 |
| 2,433,372 | Kress | Dec. 30, 1947 |
| 2,477,740 | Grote | Aug. 2, 1949 |